W. C. LEER.
HARVESTER REEL.
APPLICATION FILED OCT. 20, 1908.
925,359.
Patented June 15, 1909.
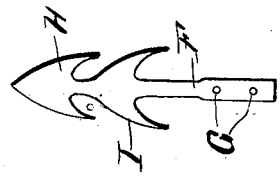
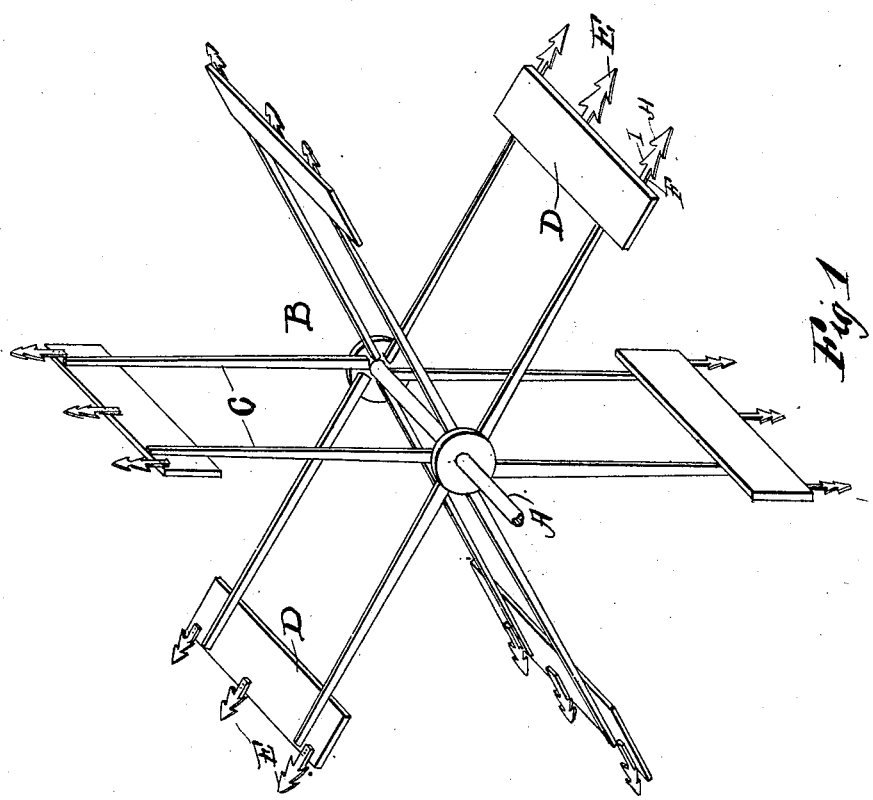
WITNESSES
Francis A. Pocock
S. M. Gallagher
INVENTOR
William C. Leer
BY
ATTORNEY

UNITED STATES PATENT OFFICE.

WILLIAM C. LEER, OF NEWCASTLE, NEBRASKA.

HARVESTER-REEL.

No. 925,359.  Specification of Letters Patent.  Patented June 15, 1909.

Application filed October 20, 1908. Serial No. 458,716.

*To all whom it may concern:*

Be it known that I, WILLIAM C. LEER, a citizen of the United States, residing at Newcastle, in the county of Dixon and State of Nebraska, have invented a certain new and useful Improvement in Harvester-Reels, of which the following is a specification.

My invention relates to a new and useful improvement in harvester reels, and has for its object to provide an exceedingly simple and effective device of this description whereby the grain which has been broken or bent over by storms so that it lays close to the ground may be drawn up by the reel and held in approximately a vertical position until the blades have cut it.

With these ends in view, this invention consists in the details of construction and combination of elements hereinafter set forth and then specifically designated by the claims.

In order that those skilled in the art to which this invention appertains may understand how to make and use the same, I will describe its construction in detail referring by letter to the accompanying drawing forming a part of this specification, in which—

Figure 1 is a perspective view of a harvester reel made in accordance with my improvement. Fig. 2, a face view of one of the rake teeth.

In carrying out my invention as here embodied, A represents a reel shaft, on which is movably secured the reel B, having the radial arms C which are joined together at their outer ends by the cross pieces D. On the cross pieces D are placed the rake teeth E, which are in the shape of arrow heads. The rake teeth E are formed to produce a shank F, in the end of which are formed the screw receiving openings G, by means of which they may be fastened to the cross pieces D. With the opposite end of this shank F is formed the head H, and between this head and the opposite end are formed the wings I.

In practice as the reel turns about its shaft the rake teeth E will pass in proximity to the surface of the ground, and as they do this they pass beneath the stalks of grain catching the same and drawing them upward until they are approximately in a vertical position, at which time they will be cut down by the blades of the reaper.

Of course I do not wish to be limited to the exact details of construction here shown, as these may be varied within certain limits without departing from the spirit of my invention.

Having thus fully described my invention, what I claim as new and useful, is—

1. The combination with a reel shaft and a reel provided with radial reel arms, cross pieces secured to the outer ends of said reel arms, rake teeth secured to said cross pieces, the rake teeth being formed to produce a shank having screw receiving openings therein, a head formed at the opposite end of said shank and wings extending from the sides of said shank, as shown and described.

2. The combination with a reel shaft and a reel provided with radial arms of cross pieces secured to the outer ends of said reel arms, rake teeth, said rake teeth being formed to produce a shank having a head at one end thereof and wings extending from the sides of said shank and means for securing said rake teeth to the cross pieces, as specified.

In testimony whereof, I have hereunto affixed my signature in the presence of two subscribing witnesses.

WILLIAM C. LEER.

Witnesses:
J. P. McGRATH,
JOHN J. BAILEY.